United States Patent
Johnson et al.

(10) Patent No.: US 8,414,852 B1
(45) Date of Patent: Apr. 9, 2013

(54) PREVENTION OF NITRO-AMINE FORMATION IN CARBON DIOXIDE ABSORPTION PROCESSES

(75) Inventors: Dennis W. Johnson, Simpsonville, SC (US); Satish Reddy, Irvine, CA (US)

(73) Assignee: Fluor Technologies Corporation, Aliso Viejo, CA (US)

( * ) Notice: Subject to any disclaimer, the term of this patent is extended or adjusted under 35 U.S.C. 154(b) by 0 days.

(21) Appl. No.: 13/301,625

(22) Filed: Nov. 21, 2011

(51) Int. Cl.
*B01D 53/56* (2006.01)
*B01D 53/62* (2006.01)
*B01D 53/74* (2006.01)

(52) U.S. Cl. ........ 423/228; 423/235; 422/168; 422/169; 422/170

(58) Field of Classification Search .................. 423/228, 423/235; 422/168, 169, 170
See application file for complete search history.

(56) References Cited

U.S. PATENT DOCUMENTS

| 7,514,053 B2 | 4/2009 | Johnson et al. | |
| 2012/0009109 A1* | 1/2012 | Wright et al. | 423/239.1 |
| 2012/0213690 A1* | 8/2012 | Petrocelli et al. | 423/437.1 |

FOREIGN PATENT DOCUMENTS

WO 2010/102877 9/2010

OTHER PUBLICATIONS

Fostas, B. et al., "Effects of NOx in the Flue Gas Degradation of MEA", Energy Poceida, 2011, vol. 4, pp. 1566-1573.

* cited by examiner

*Primary Examiner* — Timothy Vanoy
(74) *Attorney, Agent, or Firm* — Fish & Associates, PC

(57) ABSTRACT

Plants and method of treating a combustion gas are presented in which NOx compounds are removed from the combustion gas to a predetermined level to thereby create a pre-cleaned combustion gas from which $CO_2$ is removed in an absorber using an amine solvent. Preferably, the predetermined level of NOx compounds reduces nitro-amines, especially nitrosamine emission from the absorber to quantities of equal or less than 100 ppb.

20 Claims, 1 Drawing Sheet

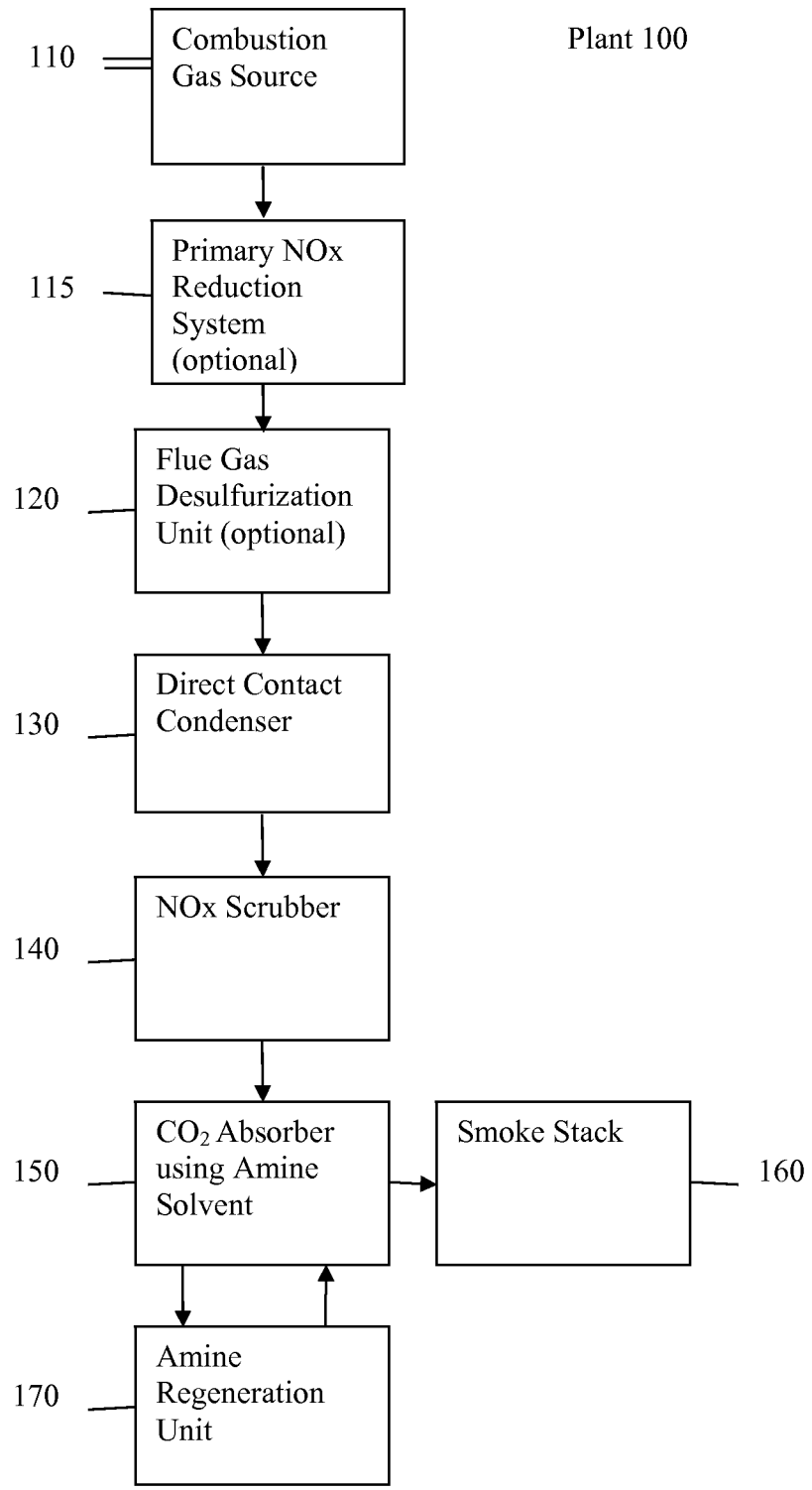

PREVENTION OF NITRO-AMINE FORMATION IN CARBON DIOXIDE ABSORPTION PROCESSES

FIELD OF THE INVENTION

The field of the invention is processing of combustion gases, and especially NOx removal to pre-clean combustion gases to thereby reduce nitro-amine emissions, especially nitrosamine emissions from a downstream $CO_2$ absorber.

BACKGROUND

Gas treatment is well known, particularly treatment of combustion gas. Most commonly, combustion gas is desulfurized and/or treated in an absorber to remove carbon dioxide, typically with an amine solvent. Examples for such systems are described in U.S. Pat. No. 7,514,053 or in WO 2010/102877. These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

While these methods are often satisfactory for a particular purpose, it has not previously been appreciated that the amine solvent in a $CO_2$ absorber may undergo undesirable reactions, and particularly formation of nitro-amine compounds, especially nitrosamine from contact with combustion gases containing $NO_2$. NO and $NO_2$ compounds formed during combustion of fossil fuels are removed in known processes including staged combustion, selective catalytic reduction (SCR), and selective non-catalytic reduction (SNCR). However, these processes which are used upstream of flue gas desulfurization equipment are not efficient enough to remove all the NOx in the flue gas. The residual NOx will therefore pass to the flue gas desulfurization and $CO_2$ absorber. In this context, it should be noted that traditional flue gas desulfurization systems do not function effectively to reduce nitrogen compounds from combustion gases. This is in part because desulfurization systems often use reagents such as limestone, which is far too acidic to remove nitrogen oxides such as NO and $NO_2$ from the gas.

It is generally known that NOx compounds are present in most combustion gases, where NO is most typically present at much higher rates than $NO_2$. For example, a typical gas from combustion of coal may contain NOx gases of which 95% are NO and about 5% are $NO_2$. This ratio is different when other fossil fuels such as gas or oil are combusted. Additionally, because NO is considered inert, it has not been appreciated that more NOx compounds should be removed from combustion gases. It has also not been appreciated that residual and relatively small amounts of $NO_2$ may ultimately lead to undesirable reactions with amine solvents which result in the formation of nitro-amine compounds, most likely because the $NO_2$ levels in typical combustion gases are relative small as compared to NO levels and reaction of $NO_2$ as an acid gas with amines to form a heat stable amine salt is known.

Therefore, even though numerous treatment processes for combustion gases are known in the art there is still a need to provide methods and devices suitable for combustion gas treatment that will lead to a reduction of generation and release of secondary reaction products, nitro-amine compounds, especially nitrosamine, from an amine absorber.

SUMMARY OF THE INVENTION

The inventive subject matter provides apparatus, systems, and methods for removal of NOx compounds from a combustion gas upstream of a $CO_2$ absorber operating with an amine solvent to thereby reduce nitro-amine emission from the absorber to less than 100 ppb, more typically less than 10 ppb, and most typically less than 1 ppb.

In one aspect of the inventive subject matter, a method of treating a combustion gas that includes NOx compounds and $CO_2$ includes a step of selectively removing NOx compounds in the combustion gas to a predetermined level by using a NOx scrubber that operates at a pH of at least 8.0 to thereby create a pre-cleaned combustion gas, and in a further step, $CO_2$ is removed from the pre-cleaned combustion gas in an absorber using an amine solvent. Most preferably, the predetermined level is such that nitro-amine emission from the absorber is less than 100 ppb.

In especially preferred methods, the NOx compounds are selectively removed from the combustion gas in a NOx scrubber at a pH greater than 9.0, and even more preferably greater than 10. While not limiting to the inventive subject matter, it is preferred that the NOx is removed in a scrubber. However, in alternative aspects, NOx scrubber may also be a component of or section in a direct contact cooling vessel or flue gas desulfurization system. It is still further preferred that the NOx scrubber (or other equivalent device) reduces the $NO_2$ level in the pre-cleaned combustion gas to less than 0.1 ppm. Thus, predetermined levels in preferred methods will achieve nitro-amine emissions from the absorber of less than 1 ppb. Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

In another aspect of the inventive subject matter, combustion gas comprising NOx compounds and $CO_2$ is treated by selectively removing the NOx compounds from the combustion gas to reduce NOx compounds to a predetermined level before removing the $CO_2$ from the gas. The predetermined level of NOx compounds is sufficiently low that nitro-amine emission from the $CO_2$ absorber are less than or equal to 100 ppb, or more preferably less than or equal to 1 ppb.

Consequently, in yet another aspect of the inventive subject matter, an apparatus for the treatment of combustion gas containing NOx compounds and $CO_2$ is envisioned which comprises a NOx scrubber which allows selective removal of NOx compounds from the combustion gas, and a $CO_2$ absorber using an amine solvent. The apparatus is configured such that the combustion gas travels through the NOx scrubber before traveling through the $CO_2$ absorber. The NOx scrubber is configured to reduce $NO_2$ compounds in the gas to a level such as, for example, less than or equal to 0.1 ppm, such that nitro-amine emission from the $CO_2$ absorber are reduced to less than or equal to 100 ppb, or more preferably less than or equal to 1 ppb.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWING

FIG. 1 is a schematic of an apparatus for the treatment of combustion gas.

DETAILED DESCRIPTION

The inventors have now discovered that nitro-amine emissions from an absorber to less than 100 ppb, more typically less than 10 ppb, and most typically less than 1 ppb can be achieved by removing NOx compounds (and especially $NO_2$) from the combustion gas upstream of a $CO_2$ absorber that operates with an amine solvent. Most preferably, NOx compounds are removed in a solvent-based process using a dedicated NOx scrubber and/or via an absorption process that is integrated with one or more other processes upstream of the amine absorber.

In one especially preferred method, combustion gas comprising NOx compounds and $CO_2$ is treated by selectively removing the NOx compounds from the combustion gas by using a NOx scrubber, which is configured to operate at a pH greater than or equal to 8.0. The NOx scrubber reduces NOx levels in the gas to a predetermined level to create a pre-cleaned combustion gas, and the pre-cleaned gas then enters a $CO_2$ absorber which uses an amine solvent. The predetermined level of NOx compounds in the pre-cleaned gas achieved by the NOx scrubber is such that nitro-amine emission from the $CO_2$ absorber is reduced to less than or equal to 100 ppb, more preferably less than 10 ppb, and most preferably less than 1 ppb.

Consequently, a device and plant apparatus for the treatment of combustion gas containing NOx compounds and $CO_2$ will typically include a NOx scrubber configured to allow selective removal of NOx compounds from the combustion gas to a predetermined level, and a $CO_2$ absorber configured to use an amine solvent, wherein the apparatus is configured such that the combustion gas travels through the NOx scrubber before traveling through the $CO_2$ absorber and the predetermined level is sufficient to reduce nitro-amine emission from the absorber to less than or equal to 100 ppb, or more preferably less than or equal to 1 ppb.

For example, as schematically depicted in FIG. 1, a plant 100 comprises a combustion gas source 110 from which flue gas is directed into an optional primary NOx reduction system 115, then to an optional flue gas desulfurization unit 120, followed by a direct contact cooler 130, which is in turn followed by NOx scrubber 140. Of course, it should be noted that additional components may be present, including economizers, air heaters, particulate collection devices, and fans (not shown FIG. 1). The primary NOx reduction system, when used, typically includes combustion controls (e.g., staged combustion SNCR and/or SCR equipment). The flue gas desulfurization unit 120 is not required for combustion gases that do not contain $SO_2$, HCl, and similar acid gases, such as gases from combustion on natural gas. Downstream of NOx scrubber 140 is the $CO_2$ absorber 150 using an amine solvent. Absorber 150 produces a cleaned exhaust that is fed to the stack 160, while rich amine solvent is fed to and regenerated in the amine regeneration unit 170 that produces lean amine for further absorption of $CO_2$ in absorber 150. In another embodiment, the NOx scrubber 140 is located before the direct contact cooler 130. As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

NOx scrubber 140 may be configured using a number of reagents. Specifically, it is contemplated that NOx scrubber may use any of magnesium, potassium, ammonium, or sodium hydroxide or carbonate, or any other highly soluble strong alkali that is effective to remove NOx. In the case of potassium or ammonium hydroxide, a fertilizer product, potassium nitrate or ammonium nitrate would be formed. To target the removal of $NO_2$, a scrubber could also be configured to use caustic soda or hydrogen peroxide or other oxidizers, or other reagents known to absorb, bind, or otherwise react with $NO_2$. Thus, it should be appreciated that the NOx scrubber will typically operate at a relatively high pH. Especially preferred pH values for the solvent in the NOx scrubber are at least 8.0, more typically at least 9.0, and most typically at least 10.0. Of course, it should also be appreciated that the solvent in the NOx scrubber may be continuously regenerated or provided in batch mode as suitable. Alternatively, it should be appreciated that the $NO_2$ removal may also be implemented by or supplemented with various $NO_2$ sorbents, and especially preferred sorbents include graphite oxides and derivatives thereof (e.g., metal-organic framework modified graphite), carbon nanotubes, silver aerosols, calcium aluminosilicate zeolites, and/or nanoporous molecular basket sorbents.

With respect to the combustion source, it should further be appreciated that contemplated methods and devices can be implemented with numerous combustion sources, and indeed, substantially all combustion sources that produce a combustion gas containing $CO_2$ and thus require removal of $CO_2$ from the combustion gas. For example, coal fired power plants, natural gas fired plants, IGCC power plants, pulp and paper manufacturing, mining, refining, steel processing, etc., produce combustion gases generally containing NOx compounds and $CO_2$. Generally, a volume of combustion gases of thousands of million standard cubic feet per day (MMscfd) is produced by a power plant or other combustion gas source. The combustion will typically be supported by air, which is high in nitrogen, and which will lead to production of significant amounts of NO, $NO_2$, $N_2O_4$, $HNO_3$, and other NOx species. Gases produced by various combustion processes may differ in composition but often contain nitrogen ($N_2$) content of around 70-80%. Typical NOx concentrations will be between 50-150 ppm, while sulfur compounds such as $SO_2$ may be as high as or higher than 180-2000 ppm. Moreover, it should be noted that the NOx composition for coal fired plants is generally 95% NO, with the remaining 5% of NOx compounds consisting of almost all $NO_2$, with smaller amounts of $HNO_3$, $N_2O$, $N_2O_4$, etc.

Temperatures of the combustion gas can be as high as 400° C. and consequently may require significant cooling. Thus, a direct contact cooler (DCC) may be implemented in order to cool the gases to a workable temperature so that subsequent cleaning of the combustion gas may be performed. Additionally, a DCC may be used alone or in conjunction with a flue gas desulfurization system (FGD) to remove harmful sulfur compounds from the gas, such as $SO_2$ and $SO_3$. While FGD systems are beneficial for reducing sulfur content of combustion gases, many FGD systems utilize limestone or other compounds and operate under slightly acidic conditions to target sulfuric compounds, and the pH in all or almost all of these processes is ineffective for the targeted removal of NOx compounds, such as NO and $NO_2$. In order to remove NOx compounds, a much higher pH is needed, such as above 8.0. Accordingly, the present invention provides methods and systems of providing NOx scrubbers with a pH of at least 8.0, preferably greater than or equal to 9.0, even more preferably greater than or equal to 10.0 in order to facilitate in the removal of NOx compounds from combustion gases prior to entering a $CO_2$ absorber using an amine solvent, thus reducing nitro-amine emission from the absorber to as low as less than or equal to 1 ppb. While not limiting to the inventive subject matter, it is generally preferred that the pressure of the combustion gas that enters the scrubber 140 is less than 200 inwg, more typically between 5-50 inwg and in some cases such as when the scrubber 140 is upstream of a fan or blower, the pressure can be slightly negative.

In still further contemplated aspects, it should be appreciated that the NOx scrubber may be functionally integrated with a direct contact condenser and/or flue gas desulfurization unit. Regardless of the manner of implementation, it is noted that the concentration of the alkaline solution and/or the solvent circulation rate is sufficient to allow removal of NOx to a desired degree. Most typically, the concentration and/or circulation rate is adjusted such that the amine absorber will release nitro-amine compounds in an amount of less than 100 ppb, more typically less than 10 ppb, and most typically less than 1 ppb. Additionally, it is contemplated that the NOx scrubber will be configured to include one or more stages which may or may not further include contacting devices as known in the art.

With respect to the downstream $CO_2$ absorber and solvent regenerator, it should be appreciated that all known systems and methods are deemed suitable for use herein so long as such systems use an amine solvent for capture of the $CO_2$. Consequently, counter-current contact absorbers with or without packing elements are deemed suitable. Likewise, solvent regenerator columns will typically include a reboiler or other steam source, and may be supplemented by a stripping column and/or column operating at subatmospheric pressure.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of treating a combustion gas comprising NOx compounds and $CO_2$, comprising:
   selectively removing NOx compounds in the combustion gas to a predetermined level by using a NOx scrubber configured to thereby create a pre-cleaned combustion gas; and
   removing the $CO_2$ from the pre-cleaned combustion gas in an absorber using an amine solvent, wherein the predetermined level is such that nitro-amine emission from the absorber is less than or equal to 100 ppb.

2. The method of claim 1 wherein selectively removing the NOx compounds from the combustion gas is performed at a pH greater than or equal to 8.0.

3. The method of claim 1 wherein selectively removing the NOx compounds from the combustion gas is performed at a pH greater than or equal to 9.0.

4. The method of claim 1 wherein selectively removing the NOx compounds from the combustion gas is performed at a pH greater than or equal to 10.0.

5. The method of claim 1 wherein selectively removing the NOx compounds from the combustion gas is performed with an oxidizer.

6. The method of claim 1 wherein the NOx scrubber is a component of a direct contact cooler vessel or a flue gas desulfurization system.

7. The method of claim 1 wherein the NOx scrubber reduces a $NO_2$ level in the pre-cleaned combustion gas to less than or equal to 0.1 ppm.

8. The method of claim 1 wherein the predetermined level is such that nitro-amine emission from the absorber is less than or equal to 1 ppb.

9. In a method of treating a combustion gas comprising NOx compounds and $CO_2$, the improvement comprising: selectively removing the NOx compounds from the combustion gas such that NOx compounds in the gas are reduced to a predetermined level to form a pre-cleaned combustion gas before removing the $CO_2$ from the pre-cleaned combustion gas in an absorber using an amine solvent, wherein the predetermined level is sufficient to reduce nitro-amine emission from the absorber to less than or equal to 100 ppb.

10. In the method of claim 9 wherein the step of selectively removing the NOx compounds from the combustion gas is performed at a pH greater than or equal to 9.0.

11. In the method of claim 9 wherein the step of selectively removing the NOx compounds from the combustion gas is performed at a pH greater than or equal to 10.0.

12. In the method of claim 9 wherein the step of selectively removing the NOx compounds from the combustion gas is performed with an oxidizer.

13. In the method of claim 9 wherein the step of selectively removing the NOx compounds from the combustion gas reduces a $NO_2$ level in the pre-cleaned combustion gas to equal or less than 0.1 ppm.

14. In the method of claim 9 wherein the predetermined level is sufficient to reduce nitro-amine emission from the absorber to less than or equal to 1 ppb.

15. An apparatus for the treatment of combustion gas, said combustion gas containing NOx compounds and $CO_2$, the apparatus comprising:
   a NOx scrubber configured to allow selective removal of NOx compounds from the combustion gas to a predetermined level; and
   a $CO_2$ absorber configured to use an amine solvent, wherein the apparatus is configured such that the combustion gas travels through the NOx scrubber before traveling through the $CO_2$ absorber and the predetermined level is sufficient to reduce nitro-amine emission from the $CO_2$ absorber to less than or equal to 100 ppb.

16. The apparatus of claim 15 wherein the NOx scrubber is configured to operate at a pH greater than or equal to 8.0.

17. The apparatus of claim 15 wherein the NOx scrubber is configured to operate with an oxidizer.

18. The apparatus of claim 15 wherein the NOx scrubber is configured to reduce the $NO_2$ compounds in the combustion gas to less than or equal to 0.1 ppm.

19. The apparatus of claim 15 wherein the NOx scrubber is a component of a direct contact cooler vessel or a flue gas desulfurization system.

20. The apparatus of claim 15 wherein the predetermined level is sufficient to reduce nitro-amine emission from the absorber to less than or equal to 1 ppb.

* * * * *